United States Patent [19]

Acker

[11] 4,191,408
[45] Mar. 4, 1980

[54] AUTOMOTIVE QUICK CONNECT TUBE COUPLING

[75] Inventor: Richard C. Acker, Chagrin Falls, Ohio

[73] Assignee: The Weatherhead Company, Cleveland, Ohio

[21] Appl. No.: 801,150

[22] Filed: May 27, 1977

[51] Int. Cl.² ............................................. F16L 17/02
[52] U.S. Cl. ................................ 285/113; 285/321; 285/348; 285/356
[58] Field of Search ............... 285/321, 356, 233, 234, 285/348, 357, 113, 388, 387, DIG. 22, 101, 102

[56] References Cited

U.S. PATENT DOCUMENTS

| 1,665,346 | 4/1928 | Clarke | 285/356 X |
| 1,754,639 | 4/1930 | Meyer | 285/321 X |
| 2,434,426 | 1/1948 | Muller | 285/321 |
| 2,538,683 | 1/1951 | Guiler et al. | 285/321 X |
| 2,779,610 | 1/1957 | Risley | 285/348 X |
| 2,848,255 | 8/1958 | Klein et al. | 285/321 X |
| 3,479,068 | 11/1969 | Brittain | 285/321 |
| 3,540,760 | 11/1970 | Miller | 285/321 |
| 3,584,313 | 6/1971 | Brown et al. | 285/321 X |
| 3,871,691 | 3/1975 | Takagi et al. | 285/321 |

FOREIGN PATENT DOCUMENTS

| 835966 | 4/1952 | Fed. Rep. of Germany | 285/356 |
| 775689 | 10/1934 | France | 285/321 |
| 956948 | 8/1949 | France | 285/356 |

Primary Examiner—Thomas F. Callaghan
Attorney, Agent, or Firm—Pearne, Gordon, Sessions

[57] ABSTRACT

A quick connect tube coupling sealingly couples a tube to a body solely by pushing the tube axially into the body. The tube is provided with a reduced diameter end portion and a conical ramp portion and an annular groove. The body has a passage extending therethrough which includes a nominal diameter portion, a counterbore portion, and a threaded end portion. A coupling subassembly is screwed into the threaded end of the passage in the body before the tube is assembled. The coupling subassembly includes a nut having a tube receiving passage and a retainer which holds a snap ring and an elastomeric seal in place prior to and after assembly of the tube.

4 Claims, 4 Drawing Figures

AUTOMOTIVE QUICK CONNECT TUBE COUPLING

BACKGROUND OF THE INVENTION

The present invention relates generally to tube couplings, and more particularly to tube couplings of the type that are known as quick connect tube couplings.

Quick connect tube couplings permit a tube to be sealingly connected to a body by straight line axial movement of the tube and without any tools. Such quick connect tube couplings are used in a wide variety of applications that require the tube coupling to be dependable and easy to use.

Quick connect tube couplings may include an annular elastomeric seal for preventing fluid leakage and a snap ring for securing the tube in place after assembly. The seal of such tube couplings is generally considered a dynamic seal, because the tube is usually able to move axially a small amount relative to the body after assembly due to manufacturing tolerances.

In U.S. patent application Ser. No. 754,567 filed Dec. 27, 1976, and now U.S. Pat. No. 4,133,564 and in U.S. Pat. Nos. 2,521,127, 3,847,421 and 2,935,343, quick connect tube couplings are disclosed in which the snap ring and the seal may be preassembled on the tube before inserting the tube into the body. In U.S. patent application Ser. No. 735,949 filed Oct. 29, 1976, and now U.S. Pat. No. 4,063,760 a quick connect tube coupling is disclosed in which the seal and the snap ring are preassembled on the body before the tube is pushed into the body.

The present invention provides a quick connect tube coupling which has a large seal surface area to prevent leakage and which can be assembled with a low axial force. This is a result of an arrangement according to the present invention which provides a large seal but does not require full compression of the seal during assembly.

An additional feature of the invention is the provision of a subassembly having a nut, a snap ring, a seal, and a retainer which secures the snap ring and the seal in place during assembly. The retainer also provides a back stop for the seal and captures the snap ring after assembly to prevent the tube from being pulled out of the body.

Both of the above described features are accomplished according to the principles of the invention by an arrangement which is relatively simple and easy to manufacture and which requires a relatively small amount of working of the tube. According to the principles of the invention, the body includes a fluid flow passage which has a nominal diameter portion, a counterbore portion, and a threaded end portion. A nut which carries the seal and the snap ring is threaded into the threaded end of the fluid flow passage in the body. The nut includes a tube receiving passage which has a counterbore near one end for receiving the snap ring.

A retainer is provided near one end of the nut for holding the snap ring in the counterbore and for properly positioning the seal relative to the nut. The retainer includes an axially extending cylindrical portion which is frictionally received in the passage in the nut. A radially inwardly extending tab portion of the retainer extends along one side of the snap ring to hold the snap ring in its counterbore. The seal is frictionally retained in the cylindrical portion of the retainer, and the radially inwardly extending tab portion of the retainer positions the seal relative to the retainer. A radially outwardly extending tab portion of the retainer positions the retainer relative to the nut so that the seal is accurately positioned relative to the nut and so that the retainer is positively locked in place upon assembly.

When the nut and the portions which are carried by the nut prior to assembly are assembled in the fluid flow passage in the body, the radially outwardly extending tab of the retainer is squeezed between the radial end face of the nut and a shoulder in the body passage so that the retainer can not move. This locks the retainer in place after assembly so that the retainer can lock both the snap ring and the seal in place after assembly of the tube.

The tube which is used in the coupling according to the present invention has a reduced diameter end portion, an annular groove, and a conical ramp therebetween. As the tube is pushed into the passage, the snap ring is expanded radially outwardly by the conical ramp. The reduced diameter end portion of the tube is received within the seal. When the conical ramp engages the seal and the tube is pushed further into the body, the conical ramp carries the seal with it to a forward position in the body counterbore. By this arrangement, the very large seal which is used in the coupling according to the present invention is not fully expanded radially outwardly and is not fully compressed between the tube and the body during axial insertion of the tube. This significantly limits the axial force required to assemble the tube. When the tube is pushed into the body the proper amount, the snap ring snaps into the annular groove in the tube to prevent the tube from being pulled out of the body. When the fluid flow passage in the body is subjected to fluid pressure, the fluid pressure acts on the seal and pushes the seal radially outwardly along the conical tube ramp and axially rearwardly to a radially confined position against the retainer.

BRIEF DESCRIPTION OF THE DRAWINGS

These and other aspects and advantages of the invention will be more readily apparent upon an understanding of the preferred embodiment of the invention shown in the drawings, wherein.

DETAILED DESCRIPTION OF THE DRAWINGS

Figure 1:
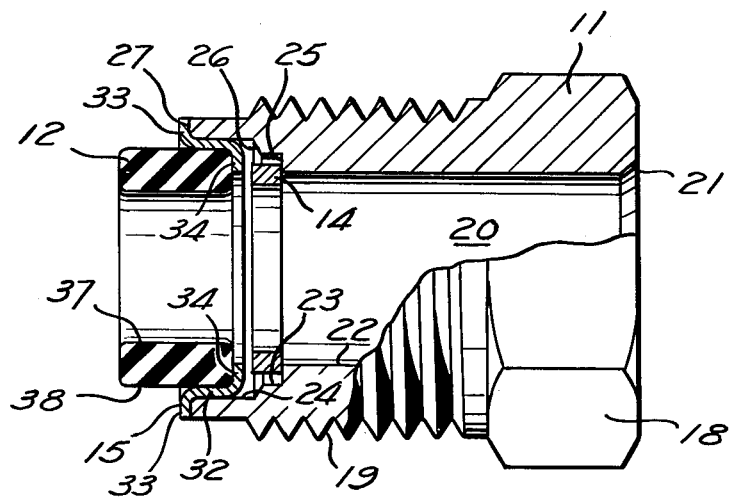
FIG. 1 is a cross-sectional side elevational view of a subassembly according to the present invention which includes a nut, a snap ring, a seal and a retainer which holds the snap ring and the seal in place.

Referring now to the drawings in greater detail, FIG. 1 shows a subassembly according to the principles of the invention. The subassembly includes a nut 11, a seal 12, a snap ring 14 and a retainer 15.

The nut 11 is preferably steel and includes a hexagonal wrench receiving portion 18 and an exterior threaded portion 19. A tube receiving passage 20 extends axially from end to end completely through the nut 11. A tapered entrant surface 21 at the right end of the passage 20 assists in the assembly of a tube into the passage 20 as described below. The passage 20 includes a nominal diameter portion 22, a first counterbore 23, and a second counterbore 24. The juncture of the nominal diameter portion 22 and the first counterbore 23 provides a first radial shoulder 25, while the juncture of the first and second counterbores 23 and 24 provides a second radial shoulder 26. The second counterbore 24 extends to the left to a third radial shoulder or end face 27.

Still referring to FIG. 1, the retainer 15 includes a cylindrical portion 32. The outer diameter of the cylindrical portion 32 is received in the second counterbore 24 with an interference fit so that the retainer 15 can be manually inserted in the counterbore 24 and is frictionally retained in the counterbore 24. The cylindrical portion 32 extends to the left to a radially outwardly extending tab portion 33. The tab portion 33 forms an annular ring which engages the end face 27 of the nut 11 to precisely axially position the retainer 15. The cylindrical portion 32 extends to the right to a radially inwardly extending tab portion 34. The inwardly extending tab portion 34 axially aligns the seal 12 relative to the nut 11 and captures the snap ring 14 in the first counterbore 23, in a manner described below. The retainer 15 in the preferred embodiment is of steel.

The seal 12 is of rubber in the preferred embodiment and has a cylindrical inner wall 37 and a cylindrical outer wall 38. The cylindrical inner wall 37 has an axial extent which is at least equal to the radial wall thickness of the seal and which is preferably at least twice the radial wall thickness of the seal. The cylindrical outer wall 38 is dimensioned so that it engages the cylindrical portion 32 of the retainer 15 with an interference fit to frictionally secure the seal 12 in the retainer 15 prior to and during assembly. The seal 12 engages the tab portion 34 of the retainer 15 to properly axially position the seal 12 relative to the nut 11.

The snap ring 14 is a C-shaped ring which is disposed in the counterbore 23 of the nut 11. The snap ring 14 is retained in the counterbore 23 by the inwardly extending tab portion 34 of the retainer 15. In the preferred embodiment, the snap ring 14 is of a beryllium copper alloy having a relatively low modulus of elasticity to minimize the force required for assembling a tube in the manner described below.

Figure 2:
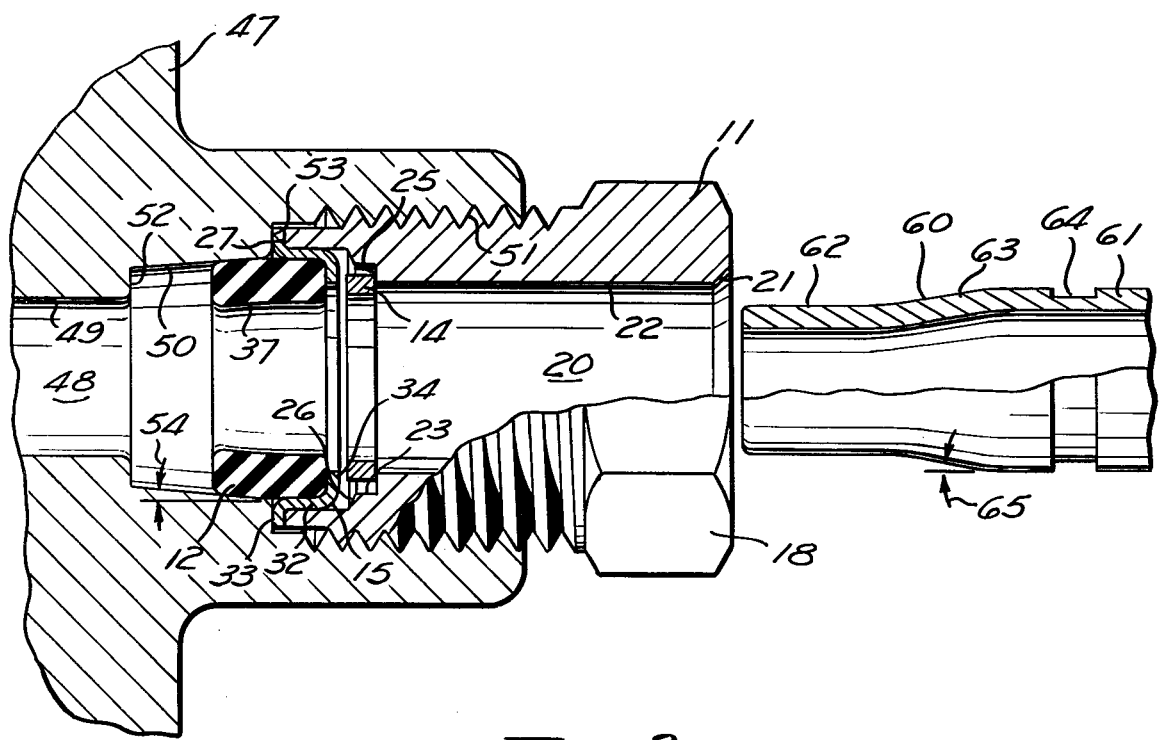
FIG. 2 is a cross-sectional side elevational view of the subassembly of FIG. 1 threaded into a body, with a portion of the tube shown prior to assembly of the tube.

Referring now to FIG. 2, the subassembly shown in FIG. 1 is preassembled on a body 47. The body 47 can be a pump or a valve or any other part of a fluid power system. The body 47 can also be an adapter which is threaded into a bore in a pump or a valve. The body 47 includes a fluid flow passage 48 extending axially therethrough. The fluid flow passage 48 includes a nominal diameter portion 49, a first counterbore or sealing surface 50, and a second counterbore or threaded end portion 51. The juncture of the nominal diameter portion 49 and the first counterbore portion 50 defines a first radial shoulder 52. The juncture of the first counterbore 50 and second counterbore 51 defines a second radial shoulder 53. The first counterbore 50 is conical and is inclined at an angle 54 from an axially extending reference line.

When the subassembly shown in FIG. 1 is threadably connected to the body 47 in the manner shown in FIG. 2, the outwardly extending tab 33 of the retainer 15 is captured between the radial shoulder 53 of the body 47 and the radial shoulder 27 of the nut 11. This restrains the retainer 15 against axial movement after it is assembled in the body 47. With the retainer 15 so restrained, the inwardly extending tab portion 34 of the retainer 15 permanently locks the snap ring 14 in the counterbore 23 of the nut 11. With this arrangement, the inwardly extending tab portion 34 also provides a back stop to restrain the seal 12 against axially rearward movement when it is subjected to hydraulic pressure, as further described below.

Still referring to FIG. 2, a portion of a tube 60 is shown. The tube 60 has an inner cylindrical surface and an outer cylindrical surface. The tube 60 includes a nominal diameter portion 61, a reduced diameter end portion 62, and a conical ramp portion 63 extending therebetween. The outer peripheral surface of the tube 60 is provided with an annular groove 64. In the preferred embodiment, the tube 60 is steel, the reduced diameter end portion and conical ramp portion 63 are produced by swagging the end of the tube, and the annular groove 64 is produced by rolling. The conical ramp portion 63 is arranged so that it is at a predetermined angle 65 to an axially extending reference line. As discussed further below, the angle 65 on the ramp 63 is greater than the angle 54 of the counterbore 50.

Referring still to FIG. 2, the assembly of the tube 60 into the body 47 is accomplished simply by pushing the tube 60 axially into the body 47 and nut 11. As the reduced diameter end portion 62 of the tube 60 is pushed into the seal 12, the conical ramp portion 63 begins to expand the snap ring 14 radially outwardly. This is because the inside diameter of the snap ring 14 is less than the outside diameter of the nominal diameter portion 61 of the tube 60. During this portion of the movement of the tube 60 into the body 47, the seal 12 remains in the position shown in FIG. 2. This is because the inside diameter of the seal 12 is slightly greater than the exterior diameter of the reduced diameter tube portion 62.

When the tube 60 is pushed sufficiently far into the body 70 that the conical ramp portion 63 engages the seal 12, further movement of the tube 60 to the left begins to move the seal 12 to the left also. As the seal 12 moves to the left, some radial compression of the wall thickness of the seal 12 takes place between the tube 60 and the counterbore 50. However, because the seal 12 does not have to move substantially up the ramp 63 and does not have to be fully radially compressed during insertion of the tube 60, the seal 12 does not offer an unsatisfactorily large amount of resistance to continued movement of the tube 60 into the body 47. This permits the seal 12 to have a large axial extent engaging both the counterbore 50 and the tube 60 without the seal 12 presenting an objectionably large resistance to insertion of the tube 60.

Figure 3:
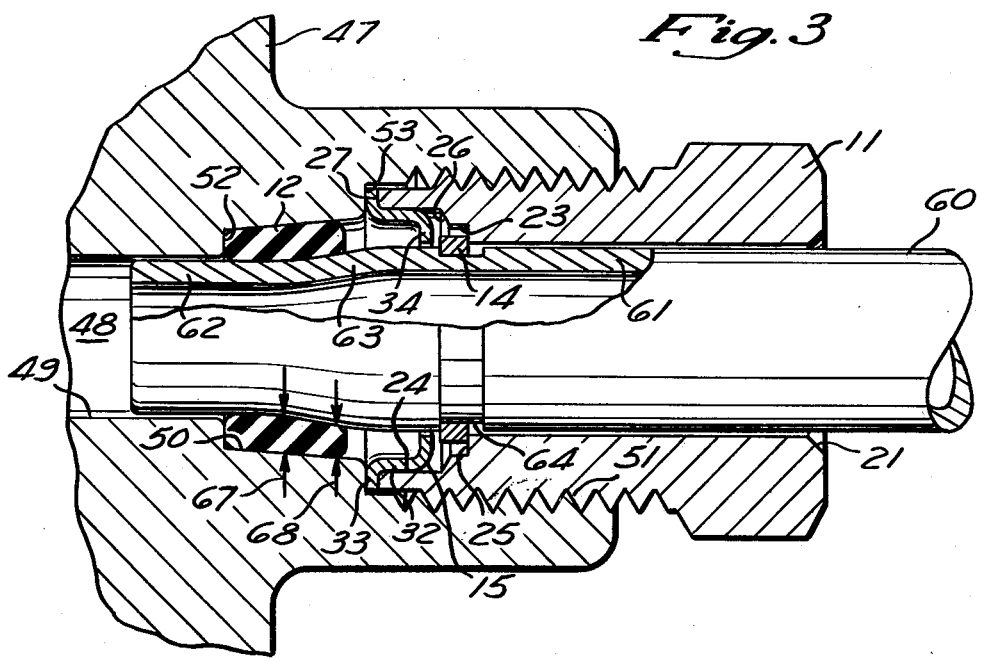
FIG. 3 is a view similar to FIG. 2, but with the tube fully assembled in the body and with the seal moved to a forward position.

When the tube 60 is further advanced into the body 47, the snap ring 14 snaps into the annular groove 64 in the tube 60. This position is shown in FIG. 3. When this occurs, the snap ring 14, because it is constrained against substantial axial movement by the shoulder 25 and retainer 15, prevents the tube 60 from being pushed too far into the body 47 and prevents the tube 60 from being pulled out of the body 47. In this position, the wall of the seal 12 is partially but not fully compressed between the counterbore 50 and the tube 60.

When the tube 60 is assembled in this manner as shown in FIG. 3, the radial distance 67 between the tube 60 and the counterbore 50 at the left end of the ramp 63 is greater than the radial distance 68 between the ramp 63 and the counterbore 50 at the right end of the ramp 63. This is a result of the angle 65 of the ramp 63 (FIG. 2) being greater than the angle 54 of the counterbore 50. This provides a tapered space between the ramp 63 and the counterbore 50 in which the seal 12 is disposed.

Once the tube 60 is pushed into the nut 11 and body 47 in the manner shown in FIG. 3, the fluid flow passage 48 and the tube 60 can be subjected to fluid pressure. When this occurs, the fluid pressure acts on the left annular end face of the seal 12. As this fluid pressure increases, such pressure acting against the left end face of the seal 12 begins to push the seal 12 to the right as viewed in FIG. 3. This causes the seal 12 to be expanded radially outwardly as it moves up the ramp 63 and to be simultaneously radially compressed between the ramp 63 and the counterbore 50 due to the distance 68 being less than the distance 67. As the fluid pressure in the fluid flow passage 48 continues to increase, the seal 12 moves all the way up the ramp 63 until it engages the tab portion 34 of the retainer 15. This position is shown in FIG. 4.

Figure 4:
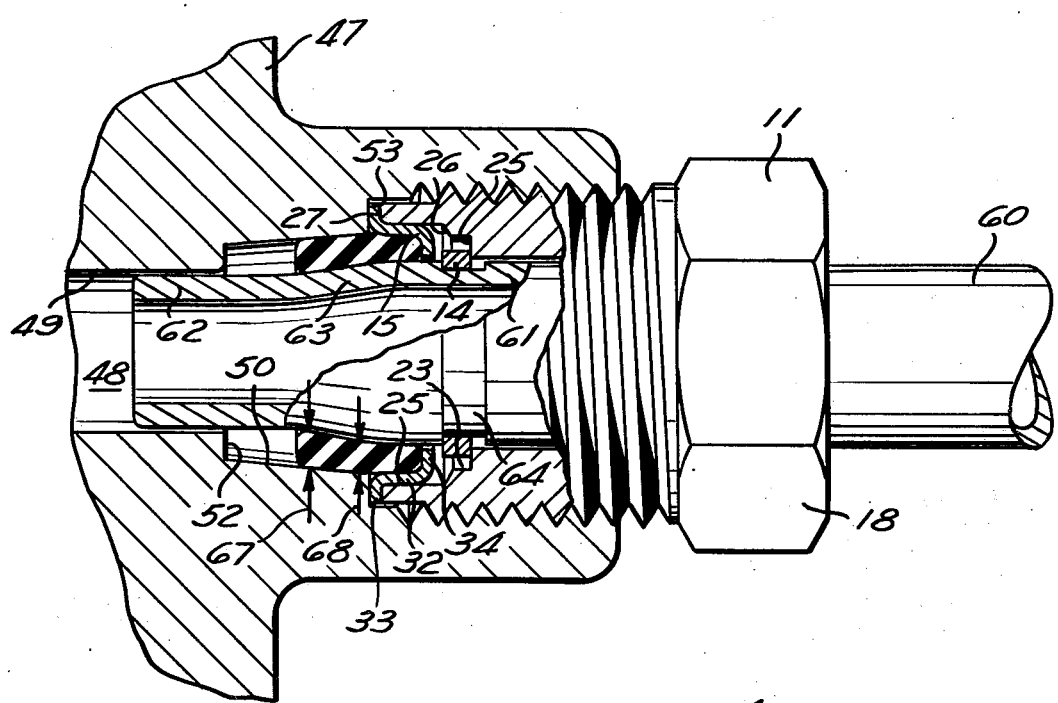
FIG. 4 is a view similar to FIG. 3, but with the seal shown in a rearward position after application of fluid pressure.

During use of the assembly shown in FIG. 4, the tube 60 may move axially back and forth a small amount. This is because the width of the groove 64 is greater than the width of the snap ring 14 to insure that the snap ring will always be able to enter the groove 64. Additionally, the distance between the shoulder 25 and the retainer portion 34 is greater than the width of the snap ring 14 to insure that the retainer 15 will always seat against the end face 27 rather than against the snap ring 14. This axial movement of the tube 60 makes the seal 12 a dynamic seal in many applications. However, because the seal 12 provides a contact area engaging the outer surface of the tube 60 which is greater than the radial wall thickness of the seal 12 and preferably at least twice the radial wall thickness of the seal 12, the seal 12 is not worn so as to permit leakage by this movement of the tube 60.

Still referring to FIG. 4, the tube 60 can be removed from the nut 11 and body 47. This is accomplished by unthreading the nut 11 from the threaded end 51 of the body 47. This permits the tube 60 and snap ring 14 to be pulled out of the body 47. When this occurs, the seal 12 and retainer 15 will remain in position on the tube 60 due to the friction between the seal 12 and the tube 60. After this disassembly, the seal 12 and the retainer 15 can slide to the left off the end of the tube 60. The snap ring 14 is then removed from the groove 64, permitting the nut 11 to slide off the end of the tube 60.

When the coupling is to be reused, the snap ring 14 and retainer 15 and seal 12 are repositioned in the nut 11 to again form the subassembly shown in FIG. 1. This subassembly is then threaded into the threaded end 51 of the body 47 in the manner shown in FIG. 2, and the tube 60 is inserted in the manner shown in FIGS. 3 and 4.

What is claimed is:

1. A coupling assembly comprising a body, a tube, a nut, a retainer, a spring clip, and an annular elastomeric ringlike seal; said body having an axially extending fluid flow passage, said passage including a nominal diameter portion and a threaded end portion and a counterbore portion between said nominal diameter portion and said threaded end portion; and tube having a cylindrical outer wall, said outer wall having a nominal diameter portion and a reduced diameter end portion and a conical ramp portion between said nominal diameter portion and said reduced diameter end portion, and an annular groove in said outer wall axially spaced from said reduced diameter end portion; said nut being threadably received in said threaded end portion of said body passage, said nut having a tube receiving passage extending axially from end to end therethrough, said tube receiving passage including a nominal diameter portion and an end surface and a counterbore between said nominal diameter portion and said end surface; said spring clip being a C-shaped snap ring disposed in said nut counterbore; said retainer including a cylindrical portion and a radial portion extending from said cylindrical portion, said radial portion being disposed adjacent to said snap ring for retaining said snap ring in said nut counterbore; said tube extending axially through said nut passage and into said body passage, said reduced diameter tube portion being disposed in said nominal diameter portion of said body passage, said conical ramp portion of said tube being disposed in said counterbore portion of said body passage, said snap ring being received in said annular groove of said tube, and said seal being disposed in said counterbore of said body passage on said outer surface of said tube, an end portion of said tube extending completely through the inner diameter of said ringlike seal, said counterbore of said body passage being conical.

2. A coupling assembly as set forth in claim 1, wherein said counterbore of said body passage and said conical ramp of said tube define a seal chamber, said seal chamber and said seal both having a radial thickness, and said radial thickness of said seal being greater than said radial thickness of said seal chamber whereby said seal is radially compressed in said seal chamber, said radial thickness of said seal chamber being greater at the end of said seal chamber near said reduced diameter tube portion than at the end of said seal chamber near said nominal diameter tube portion.

3. A coupling assembly as set forth in claim 2, wherein said seal is axially slidable in said seal chamber between a first position near said reduced diameter tube portion when said tube is initially assembled in said tube receiving passage and a second position near said nominal diameter tube portion when said tube and seal are subjected to hydraulic pressure.

4. A coupling assembly as set forth in claim 2, wherein said conical counterbore of said body passage defines a first predetermined acute angle with an axial reference line, said conical ramp of said tube defines a second predetermined acute angle with said axial reference line, and said second angle is greater than said first angle.

* * * * *